United States Patent
Furue et al.

(10) Patent No.: US 11,619,867 B2
(45) Date of Patent: Apr. 4, 2023

(54) IMAGE DISPLAY DEVICE (71) Applicant: SONY GROUP CORPORATION, Tokyo (JP)

(72) Inventors: Nobuki Furue, Tokyo (JP); Mitsuo Okumura, Tokyo (JP); Yoshihito Ohki, Tokyo (JP); Tomoharu Nakamura, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/295,518

(22) PCT Filed: Nov. 14, 2019

(86) PCT No.: PCT/JP2019/044768
§ 371 (c)(1),
(2) Date: May 20, 2021

(87) PCT Pub. No.: WO2020/110760
PCT Pub. Date: Jun. 4, 2020

(65) Prior Publication Data
US 2022/0011656 A1 Jan. 13, 2022

(30) Foreign Application Priority Data

Nov. 27, 2018 (JP) .............................. JP2018-221236

(51) Int. Cl.
*G03B 21/14* (2006.01)
*G03B 21/10* (2006.01)
*G03B 21/62* (2014.01)
*H04N 9/31* (2006.01)

(52) U.S. Cl.
CPC ............. *G03B 21/14* (2013.01); *G03B 21/10* (2013.01); *G03B 21/62* (2013.01); *H04N 9/3185* (2013.01)

(58) Field of Classification Search
CPC .. H04N 9/3141; H04N 9/3152; H04N 9/3155; H04N 9/3161; H04N 9/3164;
(Continued)

(56) References Cited

U.S. PATENT DOCUMENTS 9,330,479 B2 * 5/2016 Suzuki .................. G09G 3/002
2005/0041218 A1 * 2/2005 Hoshino ................ G09F 19/14
353/94

(Continued)

FOREIGN PATENT DOCUMENTS

JP 2007-218945 8/2007
JP 2008-145809 6/2008
(Continued)

OTHER PUBLICATIONS

International Search Report prepared by the Japan Patent Office dated Jan. 17, 2020, for International Application No. PCT/JP2019/044768.

*Primary Examiner* — Sultan Chowdhury
(74) *Attorney, Agent, or Firm* — Sheridan Ross P.C.

(57) ABSTRACT

To provide a new method for displaying a video image on a whole circumference screen. Provided is an image display device including: an emission unit configured to emit image light along a predetermined axis; a screen arranged over a whole circumference around the predetermined axis and having a cylindrical shape with the predetermined axis as a substantially central axis; and an optical unit arranged to face the emission unit with the predetermined axis as a reference, and configured to control an incident angle of the image light emitted by the emission unit, the incident angle being with respect to the screen, in which a video image displayed by the image light incident on the screen is simultaneously displayed over a whole circumference around the predetermined axis.

18 Claims, 6 Drawing Sheets

(58) Field of Classification Search
CPC ...... H04N 9/3185; G03B 21/10; G03B 21/14; G03B 21/62; G03B 21/145; G03B 21/147; G03B 21/2013; G03B 21/2033
See application file for complete search history.

(56) References Cited

U.S. PATENT DOCUMENTS

| | | | | |
|---|---|---|---|---|
| 2013/0033650 | A1* | 2/2013 | Roberts | G03B 37/06 |
| | | | | 353/69 |
| 2013/0100495 | A1* | 4/2013 | Akiba | H04N 1/3872 |
| | | | | 358/1.15 |
| 2014/0198949 | A1* | 7/2014 | Garlington | G09F 19/22 |
| | | | | 382/103 |
| 2016/0033855 | A1* | 2/2016 | Wong | G03B 21/567 |
| | | | | 353/13 |
| 2016/0165195 | A1* | 6/2016 | Tsuji | H04N 9/3155 |
| | | | | 353/121 |
| 2019/0391313 | A1* | 12/2019 | Nakamura | G03B 37/06 |

FOREIGN PATENT DOCUMENTS

| | | |
|---|---|---|
| JP | 2008-170544 | 7/2008 |
| JP | 2012-123252 | 6/2012 |
| JP | 2017-090620 | 5/2017 |
| WO | WO 2018/163945 | 9/2018 |

\* cited by examiner

IMAGE DISPLAY DEVICE

CROSS REFERENCE TO RELATED APPLICATIONS

This application is a national stage application under 35 U.S.C. 371 and claims the benefit of PCT Application No. PCT/JP2019/044768 having an international filing date of 14 Nov. 2019, which designated the United States, which PCT application claimed the benefit of Japanese Patent Application No. 2018-221236 filed 27 Nov. 2018, the entire disclosures of each of which are incorporated herein by reference.

TECHNICAL FIELD

The present technology relates to an image display device.

BACKGROUND ART

Conventionally, a technique for projecting images on a screen or the like of various shapes has been developed. For example, by projecting an image on a side surface of a cylindrical screen, it is possible to enjoy a whole circumference image displayed over all directions of 360 degrees.

Patent Document 1 discloses an image display device for displaying a video image on a whole circumference screen having a rotation body shape.

CITATION LIST

Patent Document

Patent Document 1: Pamphlet of International Publication No. 2018/163945

SUMMARY OF THE INVENTION

Problems to be Solved by the Invention

An image display device having such a whole circumference screen is expected to be applied in a wide range of fields such as advertising and amusement. Further, there is an actual situation where a new method is required for displaying a video image on the whole circumference screen.

In view of the above circumstance, a main purpose of the present technology is to provide a new method for displaying a video image on a whole circumference screen.

Solutions to Problems

That is, the present technology provides, first, an image display device including: an emission unit configured to emit image light along a predetermined axis; a screen arranged over a whole circumference around the predetermined axis and having a cylindrical shape with the predetermined axis as a substantially central axis; and an optical unit arranged to face the emission unit with the predetermined axis as a reference, and configured to control an incident angle of the image light emitted by the emission unit, the incident angle being with respect to the screen, in which a video image displayed by the image light incident on the screen is simultaneously displayed over a whole circumference around the predetermined axis.

In the present technology, a plurality of contents may be visually recognized in a superimposed manner in the video image when viewed from a predetermined direction of the screen.

Furthermore, in the present technology, brightness may be partially adjusted in the video image.

Moreover, the video image may be continuous along a circumferential direction of the screen. In this case, the video image can rotate around the predetermined axis as a substantially central axis.

In addition, a plurality of imaging units configured to capture an image of a user may be further provided, and tracking may be performed on the basis of images captured by the plurality of imaging units.

Furthermore, the video image may have a strip-shaped information display area continuous along the circumferential direction of the screen in an upper part of the screen. In this case, the information display area can be slid in downward from an upper end of the screen. Furthermore, in this case, the video image may have a difference in lightness between the information display area and a region other than the information display area. Moreover, in this case, the information display area can rotate around the predetermined axis as a substantially central axis, and a speed of the rotation can be changed in accordance with a content of information.

MODE FOR CARRYING OUT THE INVENTION

A preferred embodiment for implementing the present technology will be described below with reference to the drawings.

The embodiment described below shows one example of a representative embodiment of the present technology, and does not cause the scope of the present technology to be narrowly interpreted. Note that the description will be given in the following order.

1. Configuration of image display device 100
2. Display example 1 by image display device 100
3. Display example 2 by image display device 100
4. Display example 3 by image display device 100

1. Configuration of Image Display Device 100

Figure 1:
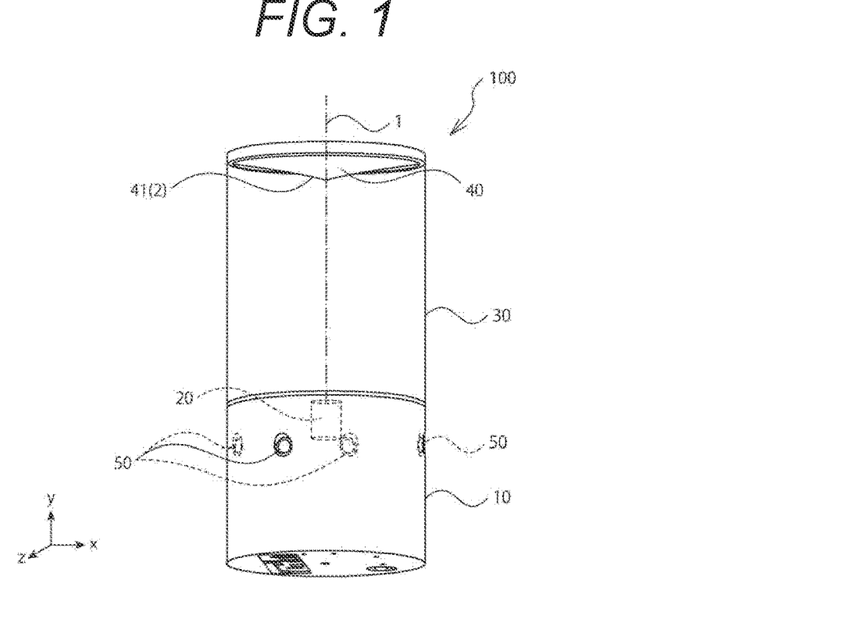
FIG. 1 is a schematic view showing a configuration example of an image display device 100.

FIG. 1 is a schematic view showing a configuration example of an image display device 100. The image display device 100 according to the present technology includes a pedestal 10, an emission unit 20, a screen 3, a reflection mirror 40, and a plurality of imaging units 50.

In the present embodiment, a description will be made in which a direction of a surface (an XZ plane) on which the image display device 100 is arranged is defined as a horizontal direction, and a direction (a Y direction) perpendicular to the horizontal direction is defined as a vertical direction. Of course, the present technology can be applied regardless of orientation in which the image display device 100 is arranged.

The pedestal 10 has a cylindrical shape and is provided in a lower portion of the image display device 100. The pedestal 10 holds the emission unit 20, the screen 30, the reflection mirror 40, and the plurality of imaging units 50 by any holding mechanism (not illustrated). Furthermore, the pedestal 10 is appropriately provided with a power supply source such as a battery (not illustrated), a speaker, other elements, and the like necessary for an operation of the image display device 100. The shape of the pedestal 10 is not particularly limited, and may be any shape such as, for example, a rectangular parallelepiped.

The emission unit 20 is installed at a position substantially at a center of the cylindrical pedestal 10 so as to face upward. The emission unit 20 radially emits image light 21 that forms an image, along an optical axis 1 extending in the vertical direction (the Y direction). Therefore, the image light 21 is emitted from the emission unit 20 at a predetermined angle of view on any surface including the optical axis 1. Note that, in the present embodiment, the optical axis 1 corresponds to a predetermined axis.

As the emission unit 20, for example, there is used a laser scanning type color projector or the like that scans laser light corresponding to each color of RGB and displays each pixel. A specific configuration of the emission unit 20 is not particularly limited, and a small mobile projector (a pico projector), a projector using a monochromatic laser beam, or the like, for example, may be appropriately used in accordance with a size, application, and the like of the image display device 100. In addition to this, any projector capable of projecting image light may be used.

For example, as the emission unit 20, it is possible to appropriately use a projection device (a projector) having: a light emitting element using a laser diode (LD), a light emitting diode (LED), or the like; and an optical modulation element using a micro electro mechanical systems (MEMS), a digital mirror device (DMD), a reflective liquid crystal, a transmissive liquid crystal, or the like. That is, it is possible to use a projection device having a configuration such as LD+MEMS, LD+DMD, LD+reflective liquid crystal, LD+transmissive liquid crystal, LED+MEMS, LED+DMD, LED+reflective liquid crystal, or LED+transmissive liquid crystal. Of course, the present technology can also be applied in a case where a projection device having other configuration is used.

The screen 30 is arranged over a whole circumference around the optical axis 1 of the emission unit 20, and is formed in a cylindrical shape around the optical axis 1 as a substantially central axis. A cylindrical body forming the screen 30 is preferably transparent, and is attached with, on an inside or an outside of the cylindrical body, a film that horizontally polarizes the image light 21 that is radially reflected toward the whole circumference of the screen 30 by a reflection surface 41 of the reflection mirror 40, which will be described later.

In the present embodiment, a central axis of the screen 30 (the cylindrical shape) substantially coincides with the optical axis 1 of the emission unit 20. In the example shown in FIG. 1, the screen 30 having a diameter similar to that of the pedestal 10 is shown. However, the present technology is not limited to this, and a diameter, a height, and the like of the screen 30 may be appropriately set.

In the present embodiment, the reflection mirror 40 has the reflection surface 41 configured to reflect the image light 21 emitted by the emission unit 20. The reflection mirror 40 is arranged so as to face the emission unit 20 with the optical axis 1 as a reference so that the reflection surface 41 faces the emission unit 20.

In the present embodiment, the reflection surface 41 has a rotationally symmetric shape with the optical axis 1 as a reference. Specifically, the reflection surface 41 includes a rotation surface 2 in which a curve obtained by cutting out a part of a parabola is rotated with the optical axis 1 as a reference. The rotation surface 2 is configured such that a concave side of the parabola (a focus side of the parabola) is a side (the reflection surface 41) that reflects light, and an axis of the parabola is different from the optical axis 1

In the present embodiment, the reflection surface 41 has a shape having an apex on the optical axis 1. That is, the reflection surface 41 has a convex shape at a point where the rotation surface 2 and the optical axis 1 intersect, when viewed from the emission unit 20. Furthermore, in a cross-sectional shape of the reflection mirror 40, curves on left and right sides of the optical axis 1 are in a shape of a parabola that is concave when viewed from the emission unit 20.

A specific configuration and the like of the reflection mirror 40 are not limited. For example, as a material forming the reflection mirror 40, any material may be used such as a resin such as acrylic, glass, or metal. For example, the reflection mirror 40 is formed by performing mirror finishing for obtaining a surface roughness Ra<0.1 μm approximately, on a material surface of these materials. In addition to this, for example, any material may be used for the reflection mirror 40 in accordance with processing accuracy, productivity, and the like.

Furthermore, for example, the reflection surface 41 of the reflection mirror 40 may be subjected to high reflectance coating using a thin film of aluminum, silver, or the like. This processing allows the image light 21 incident on the reflection surface 41 to be reflected with high efficiency. Furthermore, a surface of the reflection surface 41 may be appropriately subjected to a protective coating or the like using a thin film such as a $SiO_2$ film or a polymerized film, for protecting the reflection surface 41. In addition to this, materials of the high-reflection coating, protective coating, and the like are not limited.

The image light 21 emitted radially upward from the emission unit 20 is reflected radially toward the whole circumference of the screen 30 by the reflection surface 41 of the reflection mirror 40. As described above, the reflection surface 41 has the rotation surface 2 having a parabolic shape. Therefore, an incident angle of the image light 21 reflected by the rotation surface 2 with respect to the screen 30 is substantially constant. This configuration enables control on the incident angle of the image light 21 emitted by the emission unit 20 with respect to the screen 30. The image light 21 having the controlled incident angle is applied to the screen 30, which makes it possible to realize high-quality image display on the screen 30 arranged over a whole circumference around the optical axis 1 of the emission unit 20.

In the present embodiment, the reflection mirror 40 functions as an optical unit that controls an incident angle of the image light 21 emitted by the emission unit 20, with respect to the screen 30. Specifically, the reflection mirror 40 controls the incident angle of the image light 21 with respect to the screen 30 substantially constant.

A plurality of imaging units 50 is provided on the pedestal 10 to capture an image of a user. The imaging unit 50 includes at least one camera, and captures a video image of the user at a desired screen resolution and frame rate. The camera may be a 3D camera. The plurality of imaging units 50 is individually provided at different positions of the pedestal 10 (for example, positions that differ by approximately 180 degrees, positions that differ by approximately 90 degrees, and the like). Therefore, even in a case where one imaging unit 50 cannot capture an image of the user, another imaging unit 50 can capture an image of the user.

In the present embodiment, the image display device 100 detects presence of the user, a position of the user, a viewing height and angle of the user, and the like, on the basis of the image captured by the imaging unit 50. Specifically, the detection can be performed by capturing a video image around the image display device 100 by the imaging unit 50, and performs information processing on the captured video image. This processing may be performed by, for example, a processing unit (not illustrated) provided on the pedestal 10 or by transmitting data to an external server with a communication unit (not illustrated) provided on the pedestal 10.

In the present technology, when the image display device 100 detects the presence of the user, the position of the user, the viewing height and angle of the user, and the like, the user can be tracked on the basis of the detection. This will be described in detail in Display example 2 described later.

2. Display Example 1 by Image Display Device 100

Hereinafter, a video image display example using the image display device 100 according to the present technology will be described in detail. Note that, in the present technology, the "video image" may be a still image or a moving image.

In the present technology, the video image displayed by the image light 21 incident on the screen 30 is simultaneously displayed (in all directions of 360 degrees) over a whole circumference around the predetermined axis. This configuration allows the user to see as if the video image is 3D with depth perception depending on the display method, even if the video image displayed by the image light 21 is 2D.

Figure 2:
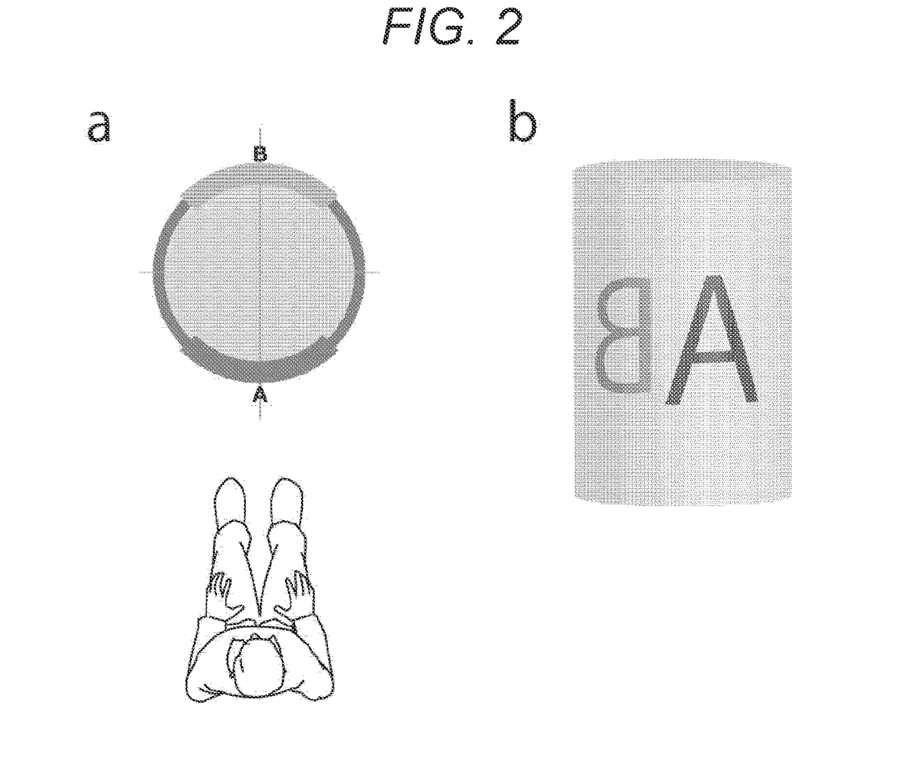
FIGS. 2a and 2b are explanatory views for explaining Display example 1.

In order to show the video image in this way, it is considered to display the video image such that a plurality of contents is visually recognized in a superimposed manner when viewed from a predetermined direction of the screen. For example, as shown in a and b of FIG. 2, by displaying the video image separately into two contents on the screen 30, a content A and a content B, the user can visually recognize the content A on a front side and the content B on a back side. This configuration can generate a sense of perspective between the two contents, and provide a video image with depth perception to the user. Note that, as shown in b in FIG. 2, the content B on the back side appears to be reversed left and right when viewed from the user.

In this case, in order to further generate a sense of perspective, it is possible to display a video image in which the brightness is partially adjusted. Specifically, in the example of FIG. 2, the content B is positively displayed by controlling projection display such that a background of the content A has a dark tone with low brightness and a background of the content B has a color scheme with high brightness. Furthermore, in a case of displaying the content A positively, it is sufficient to control the projection display such that the background of the content B has a dark tone with low brightness and the background of the content A has a color scheme with high brightness.

Figure 3:
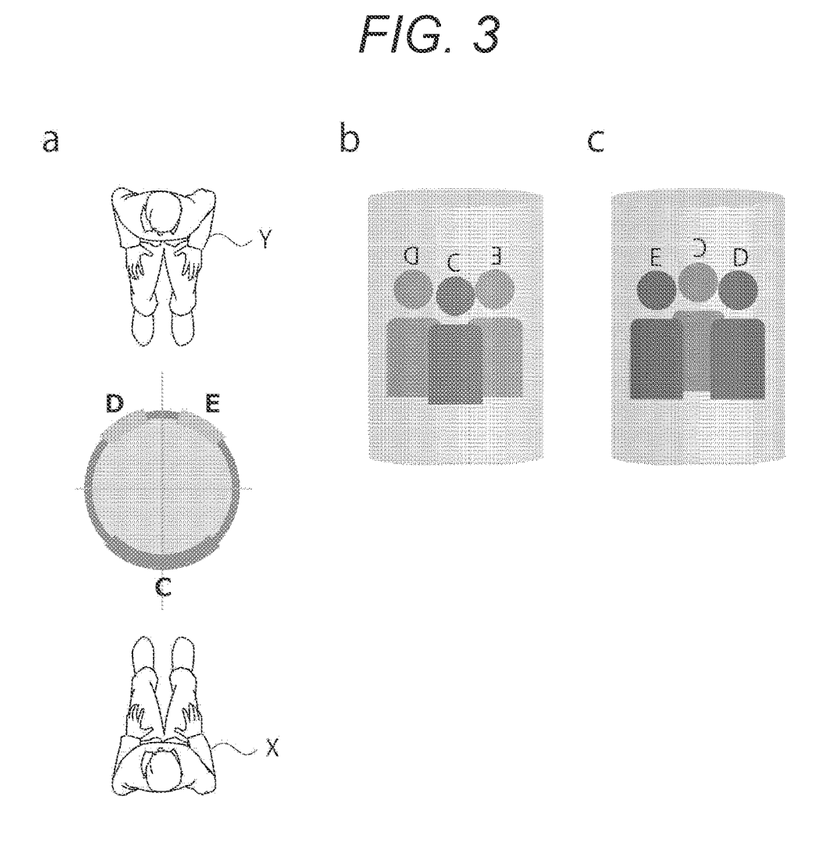
FIGS. 3a, 3b, and 3c are explanatory views for explaining Display example 1.

In the present technology, as shown by a in FIG. 3, it is also possible to virtually display a video image three dimensionally for a plurality of users. For example, when related contents C to E are displayed, each user can visually recognize these contents simultaneously. In this case, as shown in b of FIG. 3, a user X sees the content C on a front side and the content D and the content E on a back side. Whereas, as shown in c of FIG. 3, a user Y sees the content D and the content E on a front side, and the content C on a back side.

In this way, since a front/back relation of the content C to the content E appear to be switched for each user, it is possible to provide a new content experience for every user. Specifically, a live video image or the like can be displayed, and a position of a performer can be changed and displayed depending on a viewing position of the user.

Figure 4:
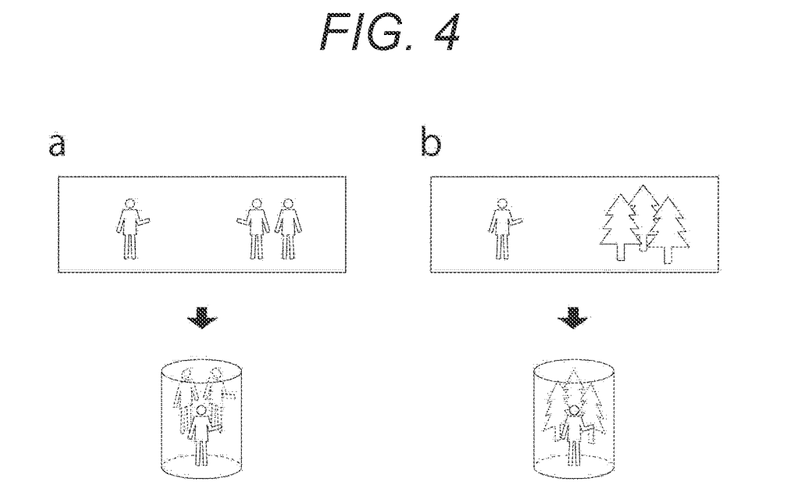
FIGS. 4a and 4b are explanatory views for explaining Display example 1.
Figure 5:
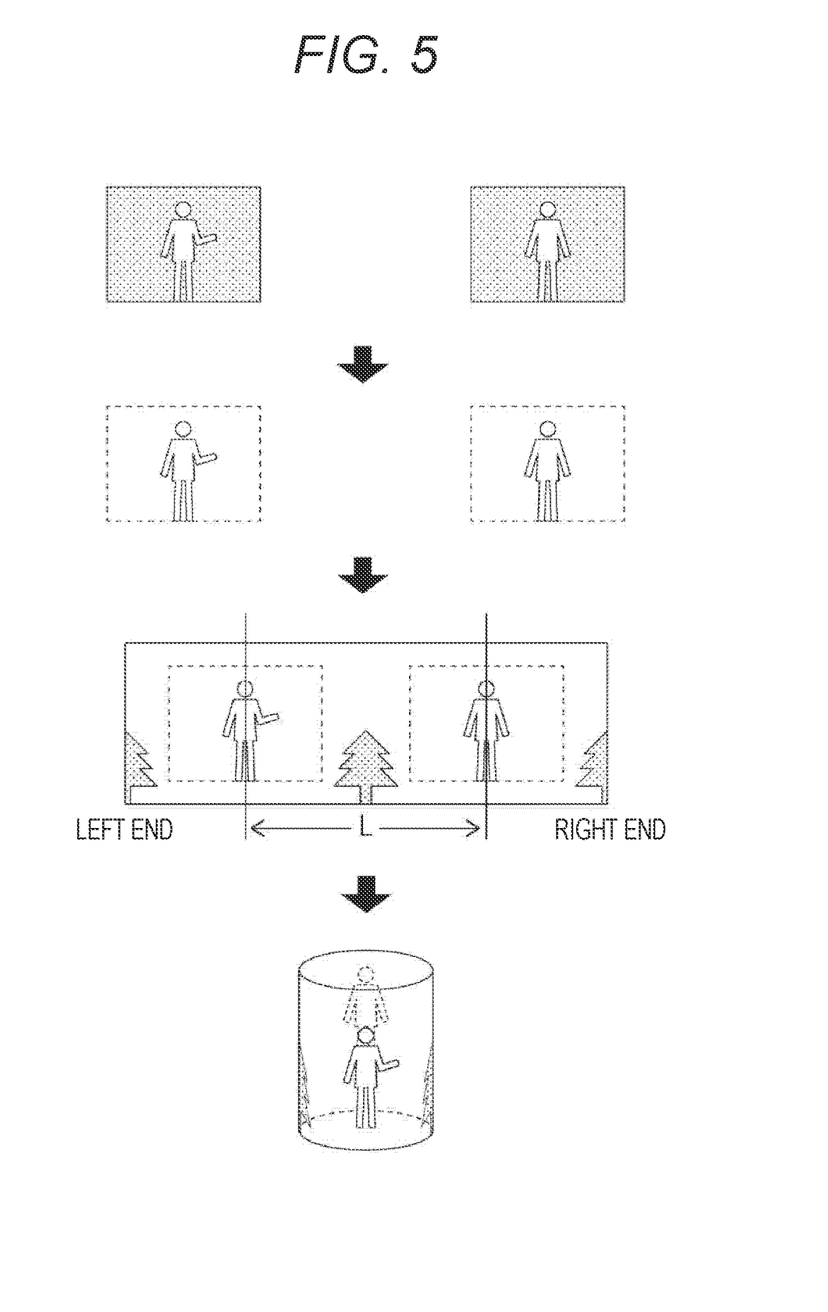
FIG. 5 is an explanatory view for explaining Display example 1.

In the present technology, it is preferable that the video image is continuous along the circumferential direction of the screen. Specifically, for example, as shown in FIGS. 4 and 5, the video image has no edges or breaks when projected onto a cylindrical screen. By making such a video image, the video image does not look strange even when viewed from any direction of the cylindrical screen (when viewed from any position in 360 degrees).

As shown in a and b of FIG. 4, by capturing an image of a subject at a predetermined interval in advance, such a video image can be created so as to be visually recognized on a front side and a back side when viewed from a predetermined position when projected onto the cylindrical screen.

Furthermore, as shown in FIG. 5, the video image can be created by synthesizing individual images captured at different locations. Specifically, first, original images are captured individually with a blue background, a green background, or the like. Thereafter, cutout processing of the subject is performed. Then, each cutout image is synthesized on a background image that does not look strange even when a left end and a right are contacted. At this time, a display position of each subject can be changed by adjusting a distance L between the individual images to a desired distance to arrange. Finally, by projecting the synthesized image onto the cylindrical screen, the two subjects are made appear to be superimposed on the front and back sides.

In the present technology, the synthesis may be performed in real time. In this case, as shown in Display example 2 described later, while tracking and recognizing a user's position, a viewing height and angle of the user, and the like on the basis of images captured by the plurality of imaging units 50 described above, it is possible to synthesize images to be displayed at display positions according to these kinds of information. Note that the synthesis can be performed using various kinds of software or the like.

Furthermore, in the present technology, the video image may be rotated around the predetermined axis as a substantially central axis. This configuration enables a new content to be provided to the user. In this case, a speed of rotation can be adjusted in accordance with a content of the video image.

3. Display Example 2 by Image Display Device 100

Hereinafter, another video image display example using the image display device 100 according to the present technology will be described in detail.

Figure 6:
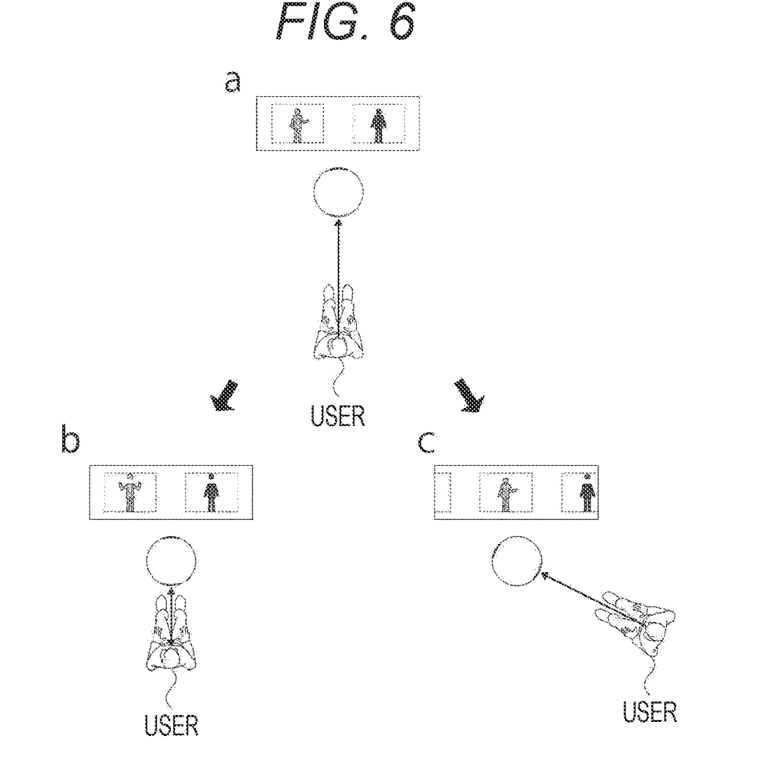
FIGS. 6a, 6b, and 6c are explanatory views for explaining Display example 2.

In this Display example 2, tracking is performed on the basis of images captured by the plurality of imaging units 50 described above. Specifically, as shown in a change from a in FIG. 6 to b in FIG. 6, it is considered to dynamically change to a different video image, or dynamically moving a Z-axis of a subject, in accordance with a viewing position of the user. In addition, as shown in a change from a in FIG. 6 to c in FIG. 6, it is considered to dynamically moving an X-axis of the subject such that the subject always faces the user, in accordance with a viewing angle of the user.

Figure 7:
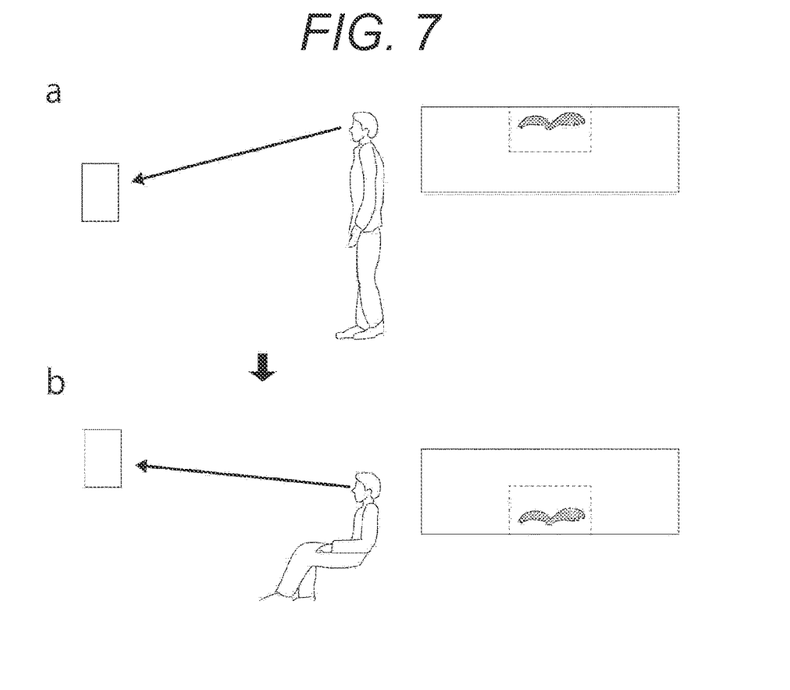
FIGS. 7a and 7b are explanatory views for explaining Display example 2.

Furthermore, as shown in a change from a in FIG. 7 to b in FIG. 7, it is considered to dynamically moving a Y-axis of the subject in accordance with a viewing height (angle) of the user.

4. Display Example 3 by Image Display Device 100

Hereinafter, another video image display example using the image display device 100 according to the present technology will be described in detail.

Figure 8:
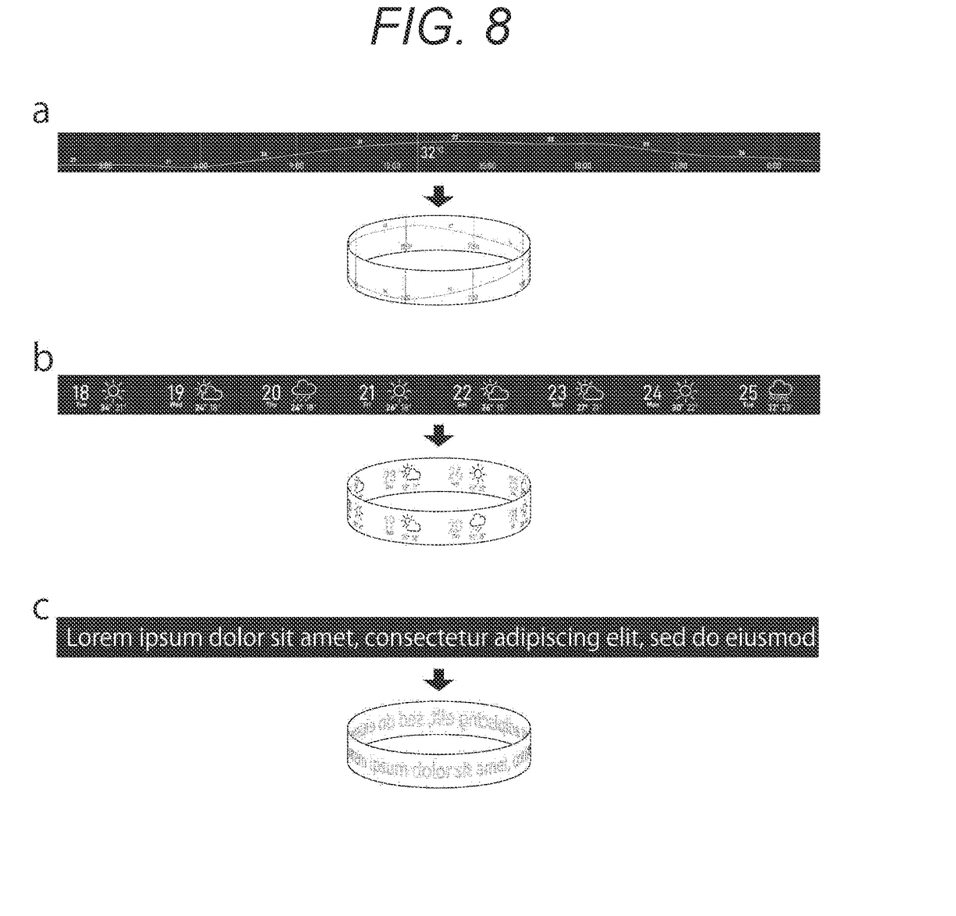
FIGS. 8a, 8b, and 8c are explanatory views for explaining Display example 3.

In this Display example 3, the video image has a strip-shaped information display area 301 that is continuous along the circumferential direction of the screen 30 in an upper part of the screen 30. This information display area 301 displays, as shown in a to c of FIG. 8, predetermined attribute information such as a news title and a received mail title, in addition to icons indicating weather, temperature, and the like.

Furthermore, the information display area 301 may be displayed in a multi-stage manner, and in this case, a size of characters in each stage, a length of sentences, and the like can be freely set as appropriate.

Figure 9:
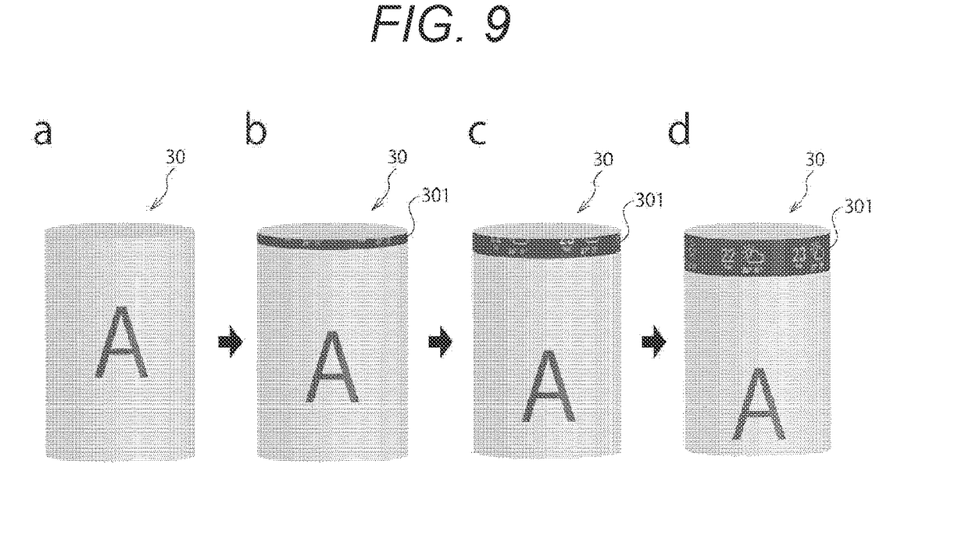
FIGS. 9a, 9b, 9c, and 9d are explanatory views for explaining Display example 3.
Figure 10:
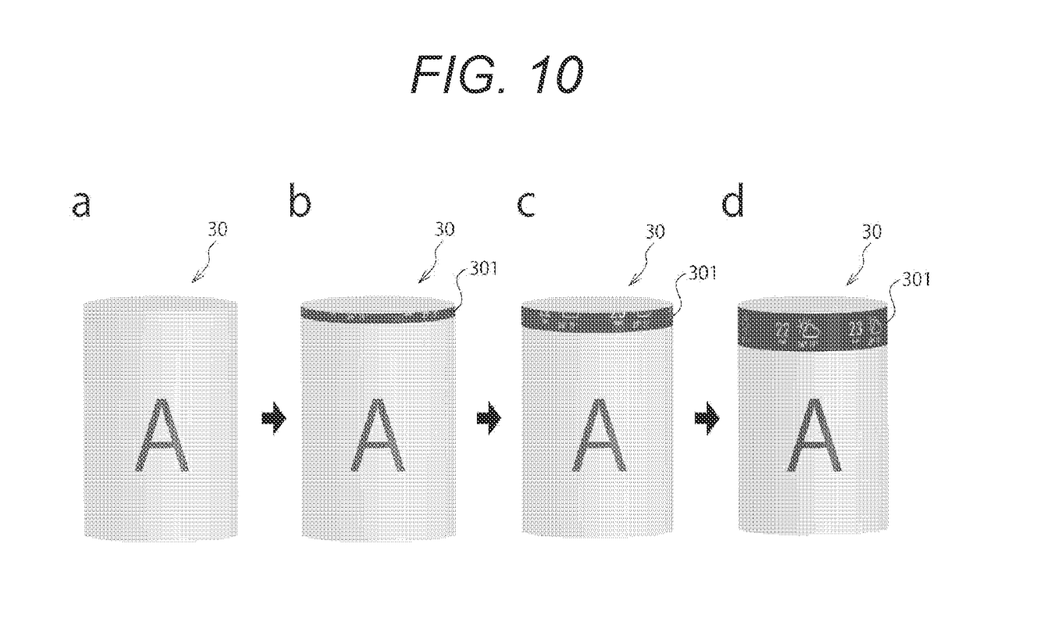
FIGS. 10a, 10b, 10c, and 10d are explanatory views for explaining Display example 3.
Figure 11:
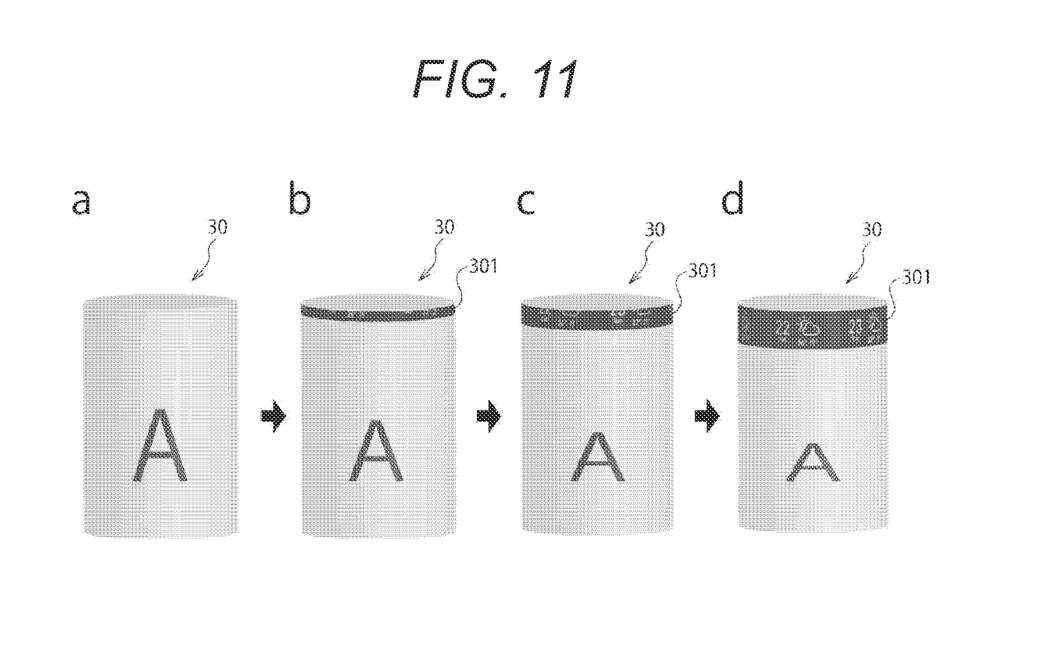
FIGS. 11a, 11b, 11c, and 11d are explanatory views for explaining Display example 3.

Note that, in the present technology, as shown in FIGS. 9 to 11, other contents can be displayed in a lower region of the information display area 301.

As shown in FIGS. 9 to 11, the information display area preferably slides in downward from an upper end of the screen.

In this case, when the information display area is slid in from the upper part of the screen with respect to the content A displayed on the cylindrical screen, the content A may be further slid to a lower part as shown in a to d of FIG. 9.

Furthermore, as shown in a to d of FIG. 10, the information display area may be overlaid on a display area of the content A (=a region other than the information display area) to be displayed. Moreover, as shown in a to d of FIG. 11, the content A may be displayed so as to fit in a vertical width after being squeezed and narrowed by appearance of the information display area.

It is preferable that the video image has a difference in lightness between the information display area 301 and the region other than the information display area 301. Specifically, for example, the information display area 301 is set to black or a dark color tone having low lightness, and the region other than the information display area 301 is set to a color having high lightness. This configuration provides a contrast between the two, and a visual effect such as displaying by making one of them stand out or giving a different impression to each.

In the present technology, the information display area 301 may rotate around the predetermined axis as a substantially central axis, and a speed of the rotation may change depending on a content of information. For example, the rotation speed is controlled to be slower in a case where a content of information to be displayed in the information display area 301 is text information such as an e-mail, and the like, while the rotation speed is controlled to be faster than the case of text information in a case of information represented by symbols such as weekly weather forecasts.

Furthermore, in a case where a content is displayed in the region other than the information display area 301, the content may be rotated around the predetermined axis as a substantially central axis, and a rotation speed may be controlled to be different from that of the information display area.

Note that, in the present technology, the following configuration can also be adopted.

(1)

An image display device including:

an emission unit configured to emit image light along a predetermined axis;

a screen arranged over a whole circumference around the predetermined axis and having a cylindrical shape with the predetermined axis as a substantially central axis; and an optical unit arranged to face the emission unit with the predetermined axis as a reference, and configured to control an incident angle of the image light emitted by the emission unit, the incident angle being with respect to the screen, in which a video image displayed by the image light incident on the screen is simultaneously displayed over a whole circumference around the predetermined axis.

(2)

The image display device according to (1), in which a plurality of contents is visually recognized in a superimposed manner in the video image when viewed from a predetermined direction of the screen.

(3)

The image display device according to (1) or (2), in which brightness is partially adjusted in the video image.

(4)

The image display device according to any one of (1) to (3), in which the video image is continuous along a circumferential direction of the screen.

(5)

The image display device according to (4), in which the video image rotates around the predetermined axis as a substantially central axis.

(6)

The image display device according to any one of (1) to (5), further including a plurality of imaging units configured to capture an image of a user, in which tracking is performed on the basis of a video image captured by the plurality of imaging units.

(7)

The image display device according to any one of (1) to (6), in which the video image has an information display area having a strip shape and being continuous along a circumferential direction of the screen in an upper part of the screen.

(8)

The image display device according to (7), in which the information display area slides in downward from an upper end of the screen.

(9)

The image display device according to (7) or (8), in which the video image has a difference in lightness between the information display area and a region other than the information display area.

(10)

The image display device according to any one of (7) to (9), in which the information display area rotates around the predetermined axis as a substantially central axis, and a speed of the rotation changes depending on a content of information.

REFERENCE SIGNS LIST

100 Image display device
1 Optical axis
2 Rotation surface
10 Pedestal
20 Emission unit
21 Image light
30 Screen
40 Reflection mirror
41 Reflection surface
50 Imaging unit
301 Information display area

The invention claimed is:

1. An image display device comprising:
a light source configured to emit image light along a predetermined axis;
a screen arranged over a whole circumference around the predetermined axis and having a cylindrical shape with the predetermined axis as a substantially central axis;
a reflector arranged to face the light source with the predetermined axis as a reference, and configured to control an incident angle of the image light emitted by the light source, the incident angle being with respect to the screen; and
a plurality of cameras configured to capture an image of a user, wherein tracking is performed on a basis of a first video image captured by the plurality of cameras,
wherein a second video image displayed by the image light incident on the screen is simultaneously displayed over a whole circumference of the screen around the predetermined axis.

2. The image display device according to claim 1, wherein a plurality of contents is visually recognized in a superimposed manner in the second video image when viewed from a predetermined direction of the screen.

3. The image display device according to claim 1, wherein brightness is partially adjusted in the second video image.

4. The image display device according to claim 1, wherein the second video image is continuous along a circumferential direction of the screen.

5. The image display device according to claim 4, wherein the second video image rotates around the predetermined.

6. The image display device according to claim 1, wherein the second video image has an information display area having a strip shape that is continuous along a circumferential direction of the screen in an upper part of the screen.

7. The image display device according to claim 6, wherein the information display area slides in downward from an upper end of the screen.

8. The image display device according to claim 6, wherein the second video image has a difference in lightness between the information display area and a region other than the information display area.

9. The image display device according to claim 6, wherein the information display area rotates around the predetermined axis, and a speed of the rotation changes depending on a content of information.

10. An image display device comprising:
a light source configured to emit image light along a predetermined axis;
a screen arranged over a whole circumference around the predetermined axis and having a cylindrical shape with the predetermined axis as a substantially central axis; and
a reflector arranged to face the light source with the predetermined axis as a reference, and configured to control an incident angle of the image light emitted by the light source, the incident angle being with respect to the screen;
wherein a video image displayed by the image light incident on the screen is simultaneously displayed over a whole circumference of the screen around the predetermined axis, wherein the video image has an information display area having a strip shape that is continuous along a circumferential direction of the screen in an upper part of the screen.

11. The image display device according to claim 10, wherein the information display area slides in downward from an upper end of the screen.

12. The image display device according to claim 10, wherein the video image has a difference in lightness between the information display area and a region other than the information display area.

13. The image display device according to claim 10, wherein the information display area rotates around the predetermined axis, and a speed of the rotation changes depending on a content of information.

14. The image display device according to claim 10, wherein a plurality of contents is visually recognized in a superimposed manner in the video image when viewed from a predetermined direction of the screen.

15. The image display device according to claim 10, wherein brightness is partially adjusted in the video image.

16. The image display device according to claim 10, wherein the video image is continuous along a circumferential direction of the screen.

17. The image display device according to claim 10, wherein the video image rotates around the predetermined axis.

18. The image display device according to claim 10, further comprising a plurality of cameras configured to capture an image of a user, wherein tracking is performed on a basis of a video image captured by the plurality of cameras.

* * * * *